July 28, 1953

W. H. VINTON 2,647,053

PHOTOGRAPHIC EMULSIONS CONTAINING
SYMMETRICAL CARBOCYANINE DYES

Filed Feb. 21, 1951

Silver chlorobromide emulsions
containing dyes identified below

FIG. 1.
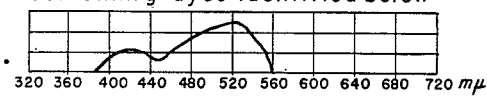

3:3'-diethyl-5:5' dicarbomethoxy
oxacarbocyanine ethosulfate

FIG. 2.
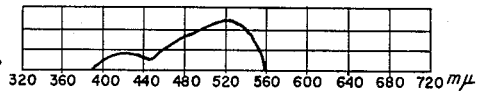

3:3'-diethyl-5:5' dicarbomethoxy
-9-methyl oxacarbocyanine iodide

FIG. 3.
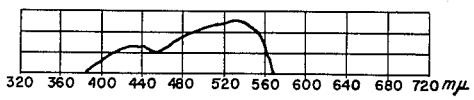

3:3'-diethyl-5:5' dicarbomethoxy
-9-ethyl oxacarbocyanine iodide

INVENTOR

WILLIAM HOWELLS VINTON

BY *Lynn Barratt Morris*

ATTORNEY

Patented July 28, 1953

2,647,053

UNITED STATES PATENT OFFICE 2,647,053

PHOTOGRAPHIC EMULSIONS CONTAINING SYMMETRICAL CARBOCYANINE DYES

William Howells Vinton, Parlin, N. J., assignor to E. I. du Pont de Nemours and Company, Wilmington, Del., a corporation of Delaware Application February 21, 1951, Serial No. 212,209

5 Claims. (Cl. 95—7)

This invention pertains to carbocyanine dyes. More particularly, it pertains to symmetrical 5-carbalkoxy benzoxazole carbocyanine dyes and to their preparation. The invention is also concerned with photographic silver halide emulsions containing such dyes.

An exceedingly large number of cyanine dyes are known. Their properties differ a great deal due to their particular constitution and molecular configuration. Many of these dyes extend the sensitivity of colloid silver halide emulsions from their normal sensitivity in the ultraviolet and blue regions of the spectrum to the green, red and infrared regions.

An object of this invention is to provide new carbocyanine dyes. A further object is to provide such dyes which confer an extra range of sensitivity. A further object is to provide a new group of carbocyanine dyes which confer an extra range of sensitivity to a silver halide emulsion so that it has good sensitivity in the green region of the spectrum. Still other objects will be apparent from the following description of the invention.

The novel symmetrical carbocyanine dyes of this invention may be represented by the general formula:

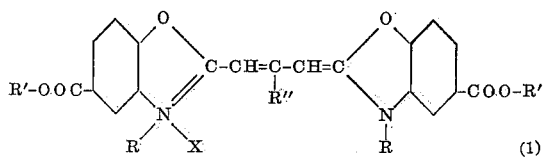

where R is an alkyl radical of 1 to 3 carbon atoms or a benzyl radical; R' is an alkyl radical of 1 to 4 carbon atoms; e. g., methyl, ethyl, propyl, or butyl; R''' is a radical taken from the group consisting of hydrogen and alkyl radicals including methyl, ethyl, isopropyl and n-propyl and X is the negative radical of an acid, e. g., halogen such as Cl, Br and I; perchlorate, —SCN, p-toluenesulfonate, methosulfate, ethosulfate, etc.

The dyes of Formula I can be made from a 2-methylbenzoxazole which contains a carbalkoxy substituent of 2 to 5 carbon atoms in the 5-position of the benzazole ring by (a) converting such a base into a cycloammonium or quaternary salt with a quaternizing or salt-forming agent such as an alkyl salt or ester of an alcohol radical with a suitable acid, e. g., an alkyl chloride, alkyl bromide, alkyl-p-toluenesulfonate, benzyl chloride, benzyl bromide, alkyl sulfate, etc., and (b) condensing the quaternary salts with an ortho-ester of a monocarboxylic acid, e. g., methyl and ethyl orthoformate, orthoacetate, orthopropionate, etc. When the orthoformate esters are used R''' in the above formula becomes hydrogen and when orthoacetates and higher homologues are used R''' becomes alkyl.

The salt-forming reaction and the cyanine dye condensation reaction can be carried out at the same time by mixing the 2-methyl-5-carbalkoxybenzoxazole base, quarternary salt-forming agent and orthoester, if desired.

The carbocyanine dyes of Formula I are useful photographic sensitizing dyes and may be incorporated with colloid-silver halide emulsions of various types including silver chloride, silver bromide, silver chlorobromide, silver idobromide, simple and mixed emulsions. Various types of colloids can be used as binding agents for the light-sensitive silver halide grains, e. g., gelatin, albumin, agar agar; hydrophilic cellulose acetate, polyamides, hydrolyzed ethylene/vinyl acetate copolymers; polyvinyl alcohol, polyvinyl acetals, etc., hydrophilic colloid color formers, e. g., polyvinyl acetals of color-forming aldehydes.

The new carbocyanine dyes can be added to emulsions in various ways. Thus, they may be added from solutions in methyl or ethyl alcohol, which may be substantially anhydrous or diluted with water. The dyes can be added to the emulsion at desired stage during its production in the conventional manners. However, they are preferably added to the emulsion as it is prepared for coating. They may also be introduced into an emulsion layer by impregnating it with a solution of the dye. The quantity of sensitizing dye used will, of course, depend on the particular emulsion to which it is added and the particular dye used. The quantities may vary from 5 and less to 30 or more milligrams per kilogram of fluid emulsion.

The preparation of the 2-methyl-5-carbalkoxybenzoxazoles will be exemplified in the following procedure for preparing one of such bases.

PROCEDURE A

*2-methyl-5-carbomethoxybenzoxazole*

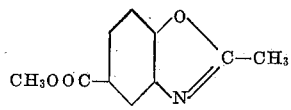

To a mixture of 300 ml. of fuming nitric acid (sp. g. 1.5) and 1500 ml. of glacial acetic acid, there was added gradually 75 g. (0.50 mol) of methyl p-hydroxybenzoate. The temperature was maintained at about 45° C. during the addition, and then the mixture was allowed to stand until the temperature dropped to 40° C. It was then poured onto cracked ice (about 3 kg.) and the yellow solid which separated was filtered off, washed well with water, taken up in ether, and dried with calcium chloride. The ether solution was filtered and the ether was evaporated. There was thus obtained 66 g. (68% of theory) of pale yellow crystals, melting at 75°–76° C. of methyl 3-nitro-4-hydroxybenzoate.

In a suitable three-neck flask fitted with a reflux condenser there was placed 120 g. of the above methyl-3-nitro-4-hydroxybenzoate and 3000 ml. of acetic anhydride. The mixture was heated to reflux, and zinc dust was added until the mixture became colorless. The mixture was then boiled for a short time and a little excess zinc added. The solution was then cooled, the zinc acetate filtered off and washed well with acetic anhydride. The filtrate and washings were distilled at atmospheric pressure to remove acetic acid and acetic anhydride. The residue was heated at atmospheric pressure until ring closure was evident (visible splitting out of acetic acid). The oily residue was then distilled in vacuo, and the distillate was refractionated, collecting material boiling at 160–165° C. at 14 mm. A yield of 138 grams was obtained (59.4% of theory). Recrystallization from alcohol gave crystals of 2-methyl-5-carbomethoxybenzoxazole melting at 69° C. Analysis based on $C_{10}H_9NO_3$

|  | Calculated, Percent | Found, Percent | |
|---|---|---|---|
| Carbon | 62.8 | 63.44 | 63.23. |
| Hydrogen | 4.71 | 4.88 | 5.24. |
| Nitrogen | 7.33 | 7.47 | 7.32 (Dumas). |

The preparation of certain symmetrical carbocyanine dyes of this invention are set forth in the following examples.

Graphs of spectrograms of the three representative dyes of Examples I, II and III are shown in the accompanying drawing, wherein:

Fig. 1 is a graph of a spectrogram of the dye of Example I in a gelatin silver chlorobromide emulsion, Fig. 2 is a graph of a spectrogram of the dye of Example II in a gelatin silver chlorobromide emulsion, Fig. 3 is a graph of a spectrogram of the dye of Example III in a gelatin silver chlorobromide emulsion.

EXAMPLE I

Preparation of the dye having the formula:

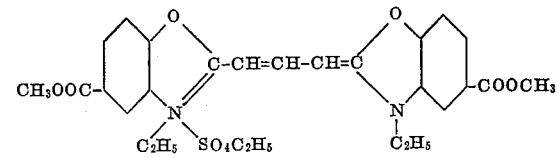

In a suitable flask there were placed 1.91 g. of 2-methyl-5-carbomethoxybenzoxazole and 1.54 g. of diethyl sulfate. The mixture was heated for three hours at a temperature of 120 to 130° C., 20 ml. of dry pyridine and 4 mls. of ethyl orthoformate were then added and the mixture was refluxed 15 minutes. A deep orange color was formed during the refluxing. The reaction mixture was diluted with diethyl ether and the dye (3:3'-diethyl-5:5'-dicarbomethoxy oxacarbocyanine ethosulfate), having the above formula crystallized out of solution. The dye crystals were taken up in hot acetone, cooled, filtered and recrystallized twice from ethyl alcohol. The orange-red crystals of dye which were obtained melted at 253 to 255° C.

The dye was added to a gelatino silver chlorobromide emulsion and conferred an extra range of sensitivity to such emulsion out to 560 millimicrons with a maximum at 520 millimicrons.

EXAMPLE II

Preparation of dye having the formula:

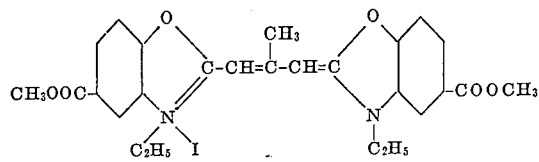

In a suitable flask 3.82 g. of 2-methyl-5-carbomethoxybenzoxazole and 3.08 g. of diethyl sulfate were heated together for three hours at 120 to 130° C., 40 mls. of dry pyridine, 8 mls. of ethyl orthoacetate and 2 mls. of acetic anhydride were then added and the mixture was refluxed for 15 minutes. An orange color formed and the reaction mixture was cooled and diluted with diethyl ether. The dye (3:3'-diethyl-5:5'-dicarbomethoxy-9-methyl oxacarbocyanine iodide), having the above formula which precipitated out was treated with an aqueous potassium iodide solution, the dye crystals were taken up in hot acetone, cooled, filtered and recrystallized twice from ethyl alcohol. The orange-red crystals of the dye melted at 250 to 252° C.

A small amount of the dye was added to a gelatino silver chlorobromide emulsion and it conferred an extra range of sensitivity to such emulsion extending it out to 560 millimicrons with a peak at 520 millimicrons.

EXAMPLE III

Preparation of dye having the formula:

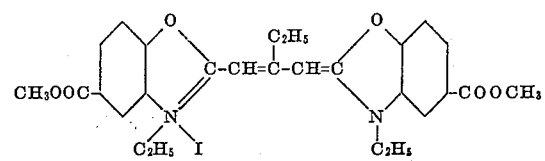

In a suitable flask 1.91 g. of 2-methyl-5-carbomethoxybenzoxazole and 1.54 g. of diethyl sulfate were heated together for three hours at 120 to 130° C., 20 mls. of dry pyridine, 4 mls. of ethyl orthopropionate and 2 mls. of propionic anhydride were then added and the mixture was refluxed for 15 minutes. An orange color formed. The solution was cooled and diluted with diethyl ether, whereupon the dye (3:3'-diethyl-5:5'-dicarbomethoxy-9-ethyl oxacarbocyanine iodide), having the above formula separated as an oily layer. The oily liquid was treated with aqueous potassium iodide solution whereupon the dye precipitated, was filtered off and recrystallized twice from ethyl alcohol. The sparkling orange crystals of the dye which were recovered had melted at 240 to 242° C.

A small amount of the dye was added to gelatino silver chlorobromide emulsion and extended its sensitivity out to 568 millimicrons with a maximum at 530 millimicrons. A small amount of the dye was added to a gelatino silver iodobromide emulsion and extended its sensitivity out to 560 millimicrons with a maximum at 520 millimicrons.

EXAMPLE IV

A mixture of 300 ml. of fuming nitric acid (Sp. Gr. 1.5) and 1500 ml. of glacial acetic acid in a 4-l. beaker equipped with stirrer was warmed to 45° C. and 83 g. (0.5 mol) of ethyl p-hydroxybenzoate was added in small portions maintaining the temperature at 45 to 48° C. After the completion of the addition, the mixture was allowed to stand for 0.5 hour and then was poured into ice water. The product separated as a yellow crystalline solid and was collected by filtration, washed with water and then recrystallized from alcohol. The yield of yellow sparkling crystals, M. P. 72 to 74° C., of ethyl 3-nitro-4-hydroxybenzoate was 88 g. (83.5%).

In a 5-l. three-necked flask equipped with a reflux condenser were placed 88 g. (0.417 mol) of ethyl 3-nitro-4-hydroxybenzoate and 1200 ml. of acetic anhydride. The mixture was heated under reflux and the reduction carried out by the addition of excess zinc dust until the solution became colorless. The reaction mixture was cooled to room temperature and the excess zinc and zinc acetate removed by filtration. The filtrate and washings were removed by distillation at reduced pressure. A viscous oily residue was obtained. The residue was transferred to a claisen flask and heated over a Bunsen flame until acetic acid was no longer given off. The hot liquid product was purified by distillation from the claisen flask at reduced pressure. The yield of ethyl 2-methyl-5-benzoxazole-carboxylate, B. P. 170 to 172° C. (16 mm.), was 43 g. (50%). The product solidified on cooling as a white solid, M. P. 50° C.

A mixture of 2.05 g. (.01 mol) of ethyl 2-methyl-5-benzoxazolecarboxylate and 1.54 g. (.01 mol) of diethyl sulfate was heated in an oil bath for three hours at 120–130° C. To this product was added 20 ml. of dry pyridine and 4 ml. of ethyl orthoformate and the resulting mixture was heated under reflux for 10 minutes with the development of an orange color. The dye of the formula:

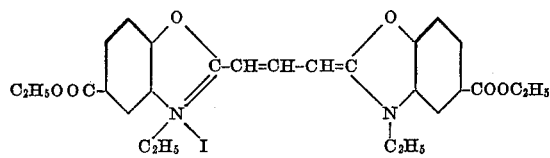

was precipitated as the iodide by the addition of an excess of aqueous potassium iodide. The dye was collected by filtration washed with water and then recrystallized twice from alcohol. The yield of red sparkling crystals, M. P. 254° C., was 1.1 g., absorption peak 488 millimicrons in ethanol. This dye confers an extra range of useful sensitivity to a colloid silver chlorobromide emulsion.

EXAMPLE V

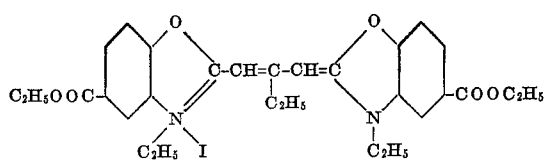

A mixture of 2.05 g. (.01 mol) of ethyl 2-methyl-5-benzoxazolecarboxylate and 1.54 g. (.01 mol) of diethylsulfate was heated in an oil bath for three hours at 120–130° C. To this product was added 20 ml. of dry pyridine and 4 ml. of ethyl orthopropionate. The resulting mixture was heated under reflux for 10 minutes with the development of an orange color. The dye of the above formula was precipitated as the iodide by the addition of an excess of aqueous potassium iodide. The dye was collected by filtration washed with water and then recrystallized twice from alcohol. The yield of red powder, M. P. 250° C., was 1.1 g., absorption peak 496 millimicrons in ethanol.

Various other carbocyanine dyes containing different alkyl salt radicals than those described in the foregoing examples can be made in a similar manner by substituting for the diethyl sulfate other alkyl salts such as ethyl p-toluene sulfonate, methyl p-toluenesulfonate, ethyl iodide, methyl chloride and ethyl benzene sulfonate.

The ethyl ethosulfate salts of Example I can be converted into other salts by a metathetical reaction, e. g., into the corresponding bromide or iodide by the addition of sodium iodide, potassium bromide, ammonium chloride, potassium thiocyanate, etc.

Similarly, in place of the ethyl orthoformate, ethyl orthoacetate and ethyl orthopropionate of the above examples, there may be substituted other alkyl orthoesters of aliphatic monocarboxylic acids, e. g., methyl orthoformate, methyl orthoacetate and methyl orthopropionate.

An advantage of this invention is that it provides the art with a new class of sensitizing dyes. These dyes are orthosensitizing dyes and especially useful in lithographic emulsions. Their chief merit lies in the fact that finished photographs are practically free from any residual stain.

As many widely different embodiments of this invention can be made without departing from the spirit and scope thereof, it is to be understood that the invention is not to be limited except as defined by the claims.

What is claimed is:

1. A colloid silver halide emulsion containing a compound having the general formula:

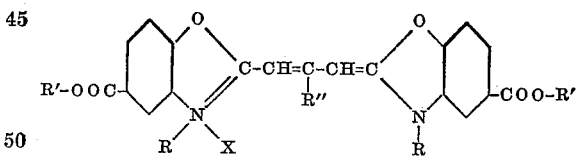

where R is a hydrocarbon radical taken from the group consisting of alkyl radicals of 1 to 3 carbon atoms and a benzyl radical; R' is an alkyl radical of 1 to 4 carbon atoms, R'' is a member taken from the group consisting of hydrogen and an alkyl radical of 1 to 3 carbon atoms and X is the negative radical of an acid.

2. A gelatino silver halide emulsion containing a compound having the general formula:

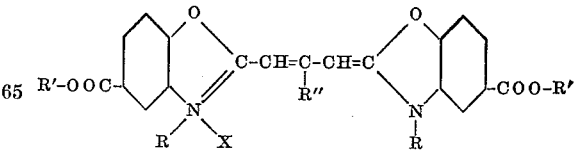

where R is a hydrocarbon radical taken from the group consisting of alkyl radicals of 1 to 3 carbon atoms and a benzyl radical; R' is an alkyl radical of 1 to 4 carbon atoms, R'' is a member taken from the group consisting of hydrogen and an alkyl radical of 1 to 3 carbon atoms and X is the negative radical of an acid.

3. A gelatino silver halide emulsion containing a compound of the formula:

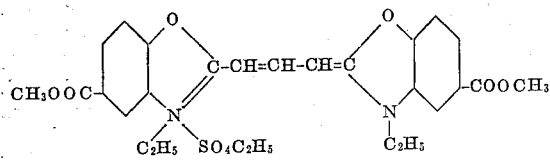

4. A gelatino silver halide emulsion containing the compound of the formula:

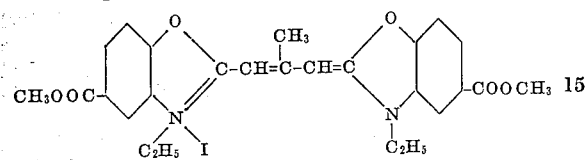

5. A gelatino silver halide emulsion containing a compound of the formula:

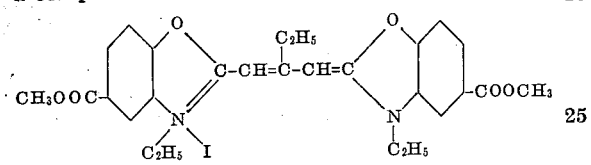

WILLIAM HOWELLS VINTON.

References Cited in the file of this patent

UNITED STATES PATENTS

| Number | Name | Date |
|---|---|---|
| 2,166,736 | White et al. | July 18, 1939 |
| 2,263,749 | White et al. | Nov. 25, 1941 |
| 2,320,654 | Riester | June 1, 1943 |
| 2,322,015 | Hamer et al. | June 15, 1943 |
| 2,338,782 | Riester | Jan. 11, 1944 |
| 2,340,882 | Kendall | Feb. 8, 1944 |
| 2,353,164 | Kendall et al. | July 11, 1944 |

OTHER REFERENCES

Chemical Abstracts, 16:3101 (Abstract of Brit. Med. Journal, 1922, I, 514–515).

Chemical Abstracts, 19:530 (Abstract of Proc. Roy Soc., London, 96 B, 317–333, 1924).